Nov. 17, 1925.

R. CHILTON

UNIVERSAL JOINT

Filed Dec. 29, 1924

INVENTOR
Roland Chilton
by Verner F. Jathermund
ATTORNEY

Nov. 17, 1925.

R. CHILTON

UNIVERSAL JOINT

Filed Dec. 29, 1924

INVENTOR

Roland Chilton
by Werner F. Rothermund
ATTORNEY

Patented Nov. 17, 1925.

1,562,080

UNITED STATES PATENT OFFICE.

ROLAND CHILTON, OF KEYPORT, NEW JERSEY, ASSIGNOR TO AEROMARINE PLANE & MOTOR COMPANY, INC., A CORPORATION OF NEW YORK.

UNIVERSAL JOINT.

Application filed December 29, 1924. Serial No. 758,765.

*To all whom it may concern:*

Be it known that I, ROLAND CHILTON, a subject of the King of England, and a resident of Keyport, in the county of Monmouth and State of New Jersey, have invented certain new and useful Improvements in Universal Joints, of which the following is a specification, reference being had to the accompanying drawings, forming part of this specification.

This invention relates in general to universal joints and more specifically to the control means for a type of joint adapted to maintain a constant velocity ratio between a driving and a driven member, in which type there is usually employed one or more intermediate members articulated to the driving and driven members respectively. The present embodiment discloses a compact form of joint particularly adapted to operate at extremely large angles under high power conditions such as are exemplified in the driving of a steerable wheel, and there is featured herein a new and novel control means in which the parts are journalled in the intermediate member; thus providing a compact and powerful joint structure of moderate over-all dimensions having special advantages to be hereinafter described. The present disclosure constitutes an improvement over that of Douglas, filed May 27, 1924, Ser. No. 716,087.

It is well known that in the type of joints referred to, constant velocity ratio can only be maintained if the intermediate member is restrained at all times to a plane bisecting the angle between the driving and driven members. Various forms of controlling devices to attain this object are known in the art. Many of these devices are theoretically correct as to mode of operation, but are disproportionately weak as to their structure and bearings as compared with the joint structure with which they are associated.

When high angles between the shafts are encountered, a large proportion of the driving torque reacts upon the intermediate member tending to force it out of the desired plane of bisection between the shafts. This relatively powerful action must be resisted by the controlling member, which accordingly needs to have the same order of strength and rigidity as is necessary in the joint itself.

Some of the controlling members of the prior art as in the present invention, comprise a hinged connection between a pair of arms, which arms must be placed within the joint structure if undue increase in the over-all size of the joint is to be avoided. These hinged arms must also be adapted to move axially of their connection with the intermediate member, and where clearance for this movement is arranged for on either side of the hinge structures of some of the known types, an adequate length of hinge or base of oscillation between the two hinged elements cannot be disposed within an intermediate member of desirable proportions. This invention accordingly features a special form of hinge connection, between the elements of the control member, and with the intermediate member, in which the hinge has relatively great length although accommodated within a reasonable size of intermediate member.

The prior art discloses pin jointed connections and offset hinges wherein one hinge element is set at a greater radius than the other, thus increasing the load on the more narrowly spaced bearings. The present invention on the contrary, features widely extended bearing surfaces disposed at equally great distances from the center of the joint, whereby the efficiency and rigidity of both sides of the control member are equal. These advantages are realized by employing a new organization wherein each half of the hinged control member is journalled directly in the intermediate member, in a manner so as to prevent separation of the parts.

Control members of the type recited in themselves incidentally constitute a crude type of universal joint, but one which does not possess constant velocity ratio. These control members must be very strongly articulated to the shafts, and when this articulation is carried out without torsional freedom as in the case of some of the devices of the prior art, there is a conflict of action between the control member which tends to cause the shafts to operate at uneven speeds, and the universal joint proper which enforces uniform rotation. In some of the known types this conflict of action would cause jamming or breakage of the parts were it not for the fact that sufficient torsional freedom is given by means of excessively loose fits in the pin joints there employed. Such looseness tends towards rapid wear and hammering of the parts. To overcome these defects the present invention discloses radially rigid articulated connections between the shaft member and the control member elements which connections are free in the torsional sense, that is to say, for slight relative rotation between the shaft and the control member. Plunging has to occur at this connection, and while the devices of the prior art show slotted or other members having only point or line contact, the present disclosure features spherical engagement between the parts, which affords substantial surface of contact.

It will be understood from the foregoing that one of the primary objects of this invention is to provide a control means for a joint having an intermediate member which shall be proportionate to the joint with regards to strength and bearing surface and at the same time can be accommodated within the joint without necessitating an increase in the over-all dimensions of the structure.

Another object of this invention is to provide a hinged control member, each half of which may constitute a one-piece rugged and direct connection between the intermediate member and one of the shafts and one which can be proportioned and fabricated so as to secure maximum strength and rigidity and shall at the same time present a maximum of well-spaced bearing surfaces at the points of connection.

Various other objects and advantages of the invention will be in part obvious from an inspection of the accompanying drawings, and in part will be more fully set forth in the following particular description of one form of mechanism embodying my invention, and the invention also consists in certain new and special features of construction and combination of parts hereinafter set forth and claimed.

Figure 1:
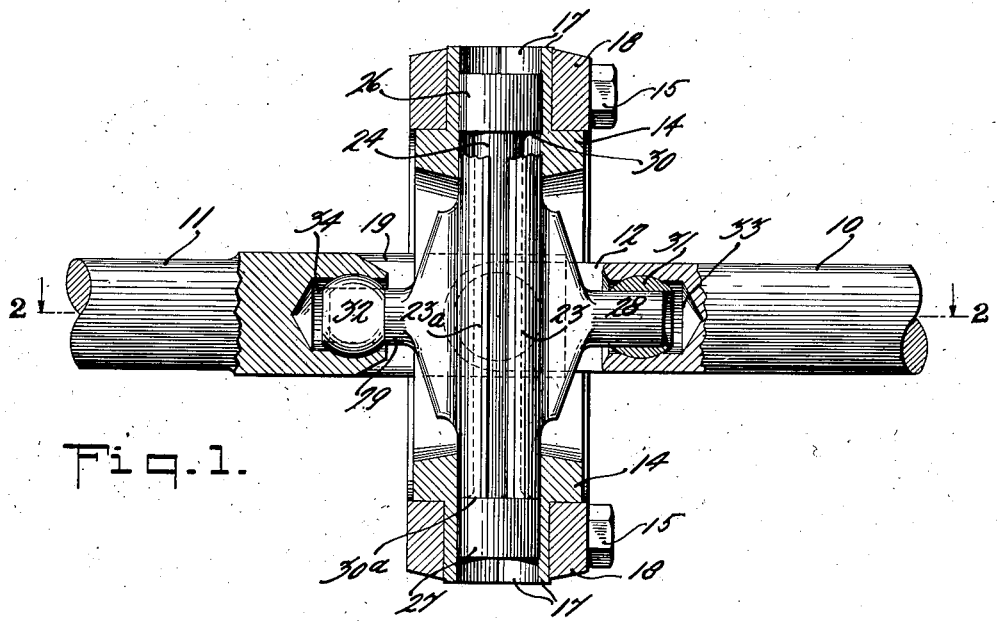
Figure 1 is a sectional view of a universal joint illustrating a preferred embodiment of the invention.

In the present instance with reference to the drawings, 10 designates a drive shaft operatively connected to the driven shaft 11 by a form of universal joint requiring a control member such as constitutes the subject matter of this invention.

The shafts 10 and 11 are illustrated in the drawings as not supported in bearings for the purpose of featuring the possibility of angular deflection therebetween. It is obvious however, that either or both of said shafts may be mounted in fixed bearings, or supported in a manner as to permit of the angular movement of one shaft relative the other as would be the case for example if the shaft 11 were replaced by a member mounted for driving a steerable vehicle wheel.

Figure 2:
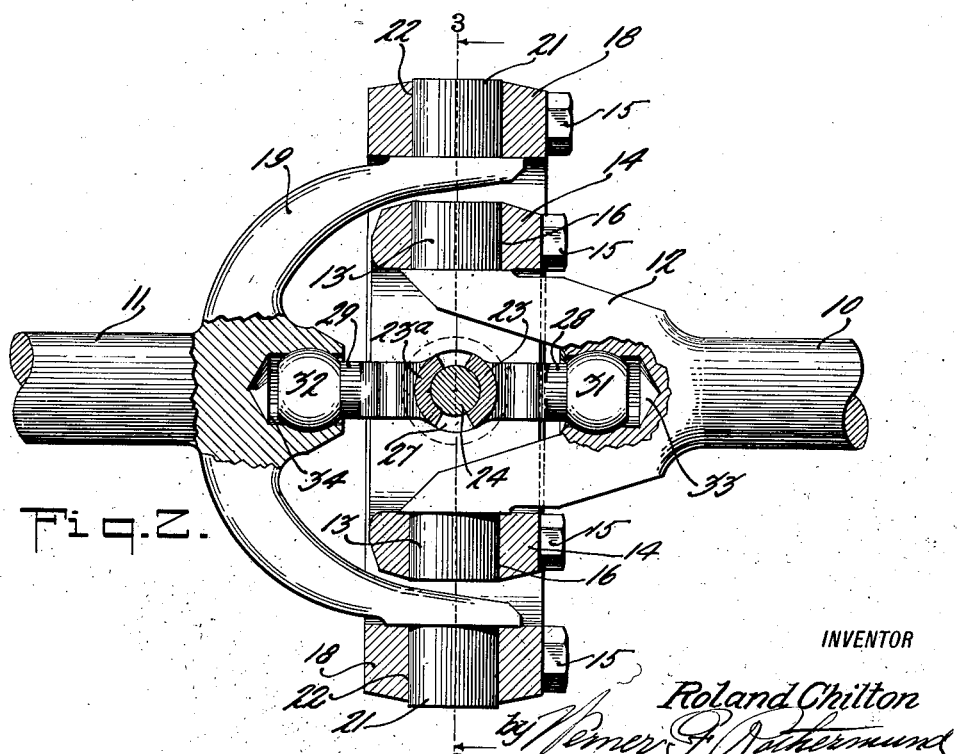
Figure 2 is a sectional view taken on the line 2—2 of Fig. 1.
Figure 3:
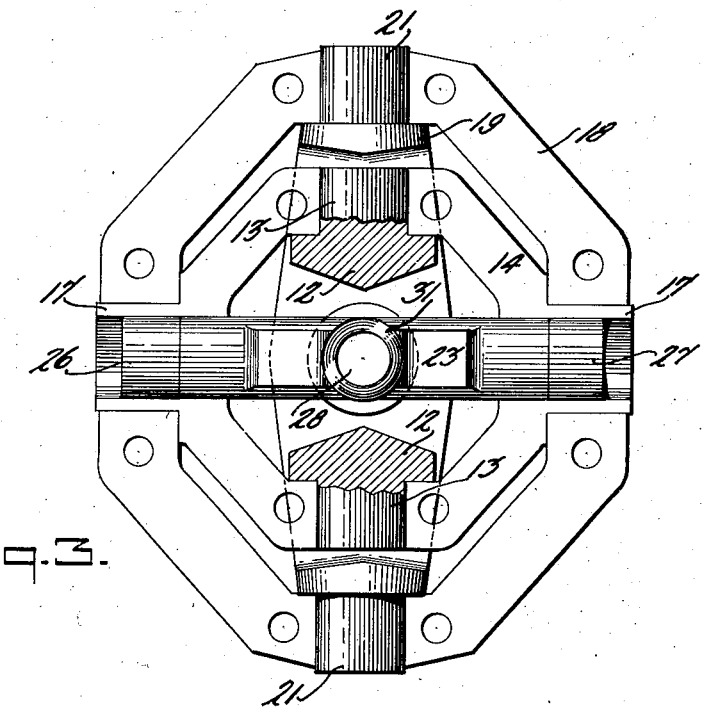
Figure 3 is a view partly in section in which some of the elements have been split on their dividing line 3—3 as indicated in Fig. 2.
Figure 4:
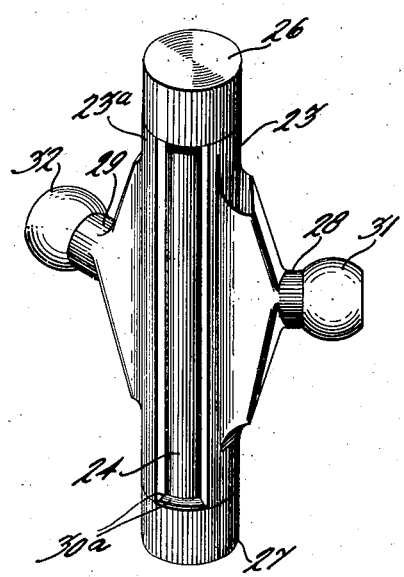
Figure 4 is a detail perspective view of a cruciform joint member showing two arms thereof in a relatively moved position.

The drive shaft 10 is bifurcated as at 12 and is provided with cross pins 13. Upon the cross pins 13 there is mounted for oscillation an inner intermediate ring member 14 provided with bores 16 in which the cross pins are disposed. This member 14 is further provided with a pair of hollow trunnions 17, disposed transaxially of the bores 16, and engaging for oscillation an outer intermediate ring member 18. In the present embodiment the rings 14, 18 are split on the line 3—3 of Fig. 2 and their respective portions secured together by the screws 15. The driven shaft 11 is provided with a U-shaped yoke 19 conveniently formed integral with the shaft in the present showing, said yoke 19 being provided with cross pins 21 which engage bores 22 of the outer ring 18 in an oscillatory manner. From this construction it will be seen that the rings 14, 18 are pivoted together for relative rotary movement about the axis of the trunnions 17 which are spaced circumferentially 90 degrees from the trunnions connecting the rings with their respective shafts. It will be noted that the outer and the inner ring members 14 and 18 form a conventional gimbal ring power transmitting structure between the driving and the driven shaft in which structure my improved control means is incorporated.

In compound joints of the type shown and as hereinbefore mentioned, it is necessary in order to realize constant velocity ratio, to control the attitude of the intermediate ring members 14, 18. The swing of the inner member 14 on the drive shaft cross pins 13 must always be one-half of the angular deflection of the drive shaft 10 (in the same plane) relative to the driven shaft 11. As shown in the drawings there is provided in the present instance a relatively rugged control structure which at the same time is so compact as to be accommodated within a joint structure of moderate over-all dimensions.

Accordingly there is slidably mounted in the hollow trunnions 17 of the inner intermediate member 14 a two-part cruciform joint controlling member having arcuate segmental portions 23, 23ᵃ adapted for relative angular motion of its parts by being hinged together upon a pintle 24 which is provided at either end with cylindrical heads 26, 27. Upon this pintle the parts 23, 23ᵃ are maintained in their hinged relation by being journalled in the bores of the hollow trunnions 17 and held against relative axial movement on the pintle by the heads 26, 27. On the arms 28, 29 of this joint controlling member there are shown slidably mounted the spherical members 31, 32, the sphere 31 being disposed in a bore 33 coaxial with the drive shaft 10 in which it is adapted for oscillation. The sphere 32 is disposed in a similar manner in a bore 34 of the driven shaft 11. It is obvious that the spheres may be conveniently formed integral with the arms 28, 29 and slidably held in the bores.

The driving and the driven shafts being articulated with the transverse arms of this cruciform joint controlling member, and the longitudinal arms of this member being supported in the bores of the inner ring 14 as described, the effect of swinging the drive shaft to a certain angle relative to the driven shaft will always tend to move the inner ring 14 through one-half of that angle. It will be understood that during the operation of the joint the segmental portions 23, 23ᵃ together with the pintle 24 will slide axially of the hollow trunnions 17 and oscillate relatively to one another therein.

Considerable axial thrust is generated between the individual segmental portions 23, 23ᵃ of the cruciform members during operation and to resist this action, adequate thrust faces 30 of equal effect in either direction have been provided and are considered a feature of the invention.

It will be seen that with the structure above described, the control member, due to the manner in which it is articulated to the driving and driven member is provided with a certain amount of rotational freedom relatively thereto which relieves this control member of any driving effort from the operation of the driven shaft.

It is obvious that with the construction as shown either one of the shafts may be utilized as the driving member and it is understood that the terms driving and driven are used interchangeably in this disclosure.

By means of the construction herein disclosed there is provided, within a universal joint of normal proportions, a control means having strength and bearing surfaces commensurate with those of the joint itself and hence suited to operate at extreme angles where a large component of the driving load reacts upon the control member.

Variations may be resorted to within the scope of the invention and portions of the improvements may be used without the others.

Having thus described my invention, I claim:—

1. In a joint having an intermediate articulated connection between a driving and a driven member, a control means comprising a two-part structure slidably journalled in said connection against separation and for relative oscillation of the parts, a pin having enlarged end portions on which the parts are articulated in defeat of relative end motion, and a rigid extension on each part engaging the adjacent member in a rotationally free manner.

2. In a joint of the character described for connecting a driving and a driven member, a control means for the joint comprising a two-part member slidably journalled in bores of the joint for relative oscillation of its parts, a portion extending laterally from each of said parts and rigid therewith, said portions respectively engaging the driving and the driven member in a rotationally free manner, a pintle, and shoulder means on said pintle engaging the parts of the control member against relative end motion in either direction.

3. In a universal joint having an intermediate member, a controlling member comprising in combination, an axis pin, segmental sectioned portions adapted for oscillation about the axis pin and for engagement with the intermediate member, cross arms rigidly perpendicular with the segmental portions and respectively engaging the driving and driven members.

4. In a universal joint having a driving and driven member and an intermediate member, a controlling member comprising in combination, an axis pin, segmental sectioned portions adapted for oscillation about the axis pin and for engagement with the intermediate member, cross arms rigidly perpendicular with the segmental portions and respectively engaging the driving and driven members, and means adapted to locate the segmental portions against relative axial motion.

5. The combination with a universal joint having a driving and driven shaft and a pair of intermediate members, of a non-driving connection between the shafts and the intermediate members adapted to maintain one of said members in a plane bisecting the angle between the axes of the shafts and comprising, a pintle, a pair of elements hinged upon said pintle and respectively articulated to the driving and driven shafts for sliding and oscillation, thrust faces on said pintle restraining relative end motion of the elements, said elements sustained by the intermediate members against separation.

6. In a universal joint having a pair of intermediate members connected by trunnions and each pivoted respectively to a driving and a driven member, a controlling means comprising a pintle, segmental portions pivoted upon said pintle about the axis of the trunnions, said segmental portions being journalled in bores in said trunnions for oscillation and sliding, and cross arms respectively rigid with the segmental portions and axially articulated to the driving and the driven members respectively.

7. The combination with a joint comprising a driving and a driven member and a flexible driving connection therebetween including a frame member adapted to be disposed in a plane bisecting the angle between the driving and driven members, of a means adapted to sustain said member in said plane and comprising, a pintle having enlarged end portions, a pair of elements having segmental portions adapted to fit the pintle between said end portions and abutting thereagainst, the ends of the pintle and the segmental portions being cylindrical and journalled in the frame member for oscillation and sliding, said segmental portions also adapted for relative angular motion on the pintle, and laterally extending arms on the segmental portions non-drivably articulated to the driving and driven member respectively.

8. In a universal joint having an intermediate member, a controlling member comprising in combination, an axis pin, segmental sectioned portions adapted for oscillation about the axis pin and for engagement with the intermediate member, cross arms rigidly perpendicular with the segmental portions and respectively engaging the driving and driven members, and shoulders on the axis pin adapted to locate the segmental portions against relative axial motion.

9. In a universal joint having a driving and a driven member and an intermediate member, the combination of, spaced apart aligned bearings in the intermediate member, a joint controlling means including two rigid members having a hinged relation and provided with portions extending into said bearings, said portions adapted to be laterally engaged by the bearings in a manner as to maintain their hinged relationship, and an element provided with suitable shoulders adapted to restrain relative axial motion between the rigid members in either direction.

10. In a universal joint having a driving and a driven member and an intermediate member, the combination of, spaced apart aligned bearings in the intermediate member, a joint controlling means including a member extending from one bearing to the other and provided with enlarged ends journalled therein for sliding, a pair of rigid members provided with portions having a hinged relation and extending into said bearings, said portions supported on the first said member and maintained in their hinged relation by said bearings and restrained against relative axial motion in either direction by the enlarged ends.

11. In a universal joint having a driving and a driven member and an intermediate member provided with spaced apart aligned bearings, the combination of, a joint controlling means including a center pin provided with a head at either end journalled in said bearings for sliding, two similar members adapted to swing about said pin and having portions extending into said bearings, said portions restrained against separation by said bearings and restrained against relative end motion by said heads.

12. In a universal joint having a driving and a driven member and an intermediate member, the combination of, diametrically opposite spaced apart aligned bearings in the intermediate member, a joint controlling means including a center pin journalled in the bearings and provided with a central portion of reduced diameter, two similar members adapted for lateral assembly on the central portion of said pin, said portions also journalled in the bearings and held in their assembled relation thereby, said pin adapted to restrain relative end motion between said members.

13. A universal joint including in combination, a driving and a driven member and a pair of intermediate members pivoted together, diametrically opposite spaced apart aligned bearings in the intermediate members coaxial with the pivots, a joint controlling means including a cylindrical pin having enlarged end portions, two similar members adapted for lateral assembly on said pin and provided with portions arcuate in cross section and conformed to fit the pin between the end portions, said members and pin journalled in the bearings and restrained against relative end motion by said end portions.

14. The combination with a universal joint having a driving and a driven shaft and an intermediate member, of a non-driving connection between the shafts and the intermediate member adapted to maintain the intermediate member in a plane bisecting the angle between the axes of the shafts and comprising, a pintle, a pair of members hinged upon said pintle and engaging the driving and driven shafts respectively for sliding and oscillation, said members journalled in the intermediate member about the axis of the pintle in defeat of separation of the parts.

15. In a universal joint having a driving and driven member and an intermediate drive transmitting connection, an element in said connection provided with hollow trunnions, a joint control means comprising a pintle having enlarged head portions, a pair of segmental members adapted for relative angular motion by arcuate engagement with said pintle and maintained in their hinged relation by being journalled in the bores of the hollow trunnions so as to permit oscillation and sliding therein, said member being held against relative axial movement on the pintle by the head portions thereon, and laterally extending arms one for each member and rigid therewith, said arms respectively articulated to the driving and driven members for sliding and oscillation.

Signed at Keyport, in the county of Monmouth, and State of New Jersey, this 23rd day of December, A. D. 1924.

ROLAND CHILTON.